(12) United States Patent
Sims, Jr.

(10) Patent No.: US 7,043,982 B2
(45) Date of Patent: May 16, 2006

(54) FUEL LEVEL SENDING UNIT AND CONTACT BUTTON FOR SAME

(75) Inventor: Dewey McKinley Sims, Jr., Wayne, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/672,326

(22) Filed: Sep. 26, 2003

(65) Prior Publication Data

US 2005/0066723 A1    Mar. 31, 2005

(51) Int. Cl.
*G01F 23/36*    (2006.01)
*G01F 23/52*    (2006.01)
*G01F 23/60*    (2006.01)

(52) U.S. Cl. ........................................ 73/313

(58) Field of Classification Search .................. 73/313, 73/317, 314; 116/227, 228; 338/68, 202

See application file for complete search history.

(56) References Cited

U.S. PATENT DOCUMENTS

| 3,629,778 | A | | 12/1971 | Mogens ...................... 338/183 |
| 3,876,967 | A | | 4/1975 | Hehl et al. .................. 338/126 |
| 4,220,944 | A | * | 9/1980 | Pudelko et al. ............. 338/176 |
| 4,928,083 | A | | 5/1990 | Sims, Jr. et al. ............ 338/202 |
| 5,341,679 | A | * | 8/1994 | Walkowski et al. ........... 73/317 |
| 5,752,409 | A | | 5/1998 | Lippmann et al. ........ 73/290 R |
| 6,269,695 | B1 | | 8/2001 | Cesternino et al. ........... 73/313 |
| 6,425,288 | B1 | * | 7/2002 | Pauer .......................... 73/305 |

* cited by examiner

*Primary Examiner*—Hezron Williams
*Assistant Examiner*—Tamiko Bellamy
(74) *Attorney, Agent, or Firm*—Michael Best & Friedrich LLP

(57) ABSTRACT

A contact button is configured to move along a resistor path of a potentiometer in a first direction and a second direction opposite the first direction. The contact button includes a body having a first end configured to lead the body when the contact button moves in the first direction, and a second end configured to lead the body when the contact button moves in the second direction. At least one of the first and second ends are generally wedge-shaped to facilitate moving debris out of a path of the contact button as the contact button moves along the resistor path.

21 Claims, 5 Drawing Sheets

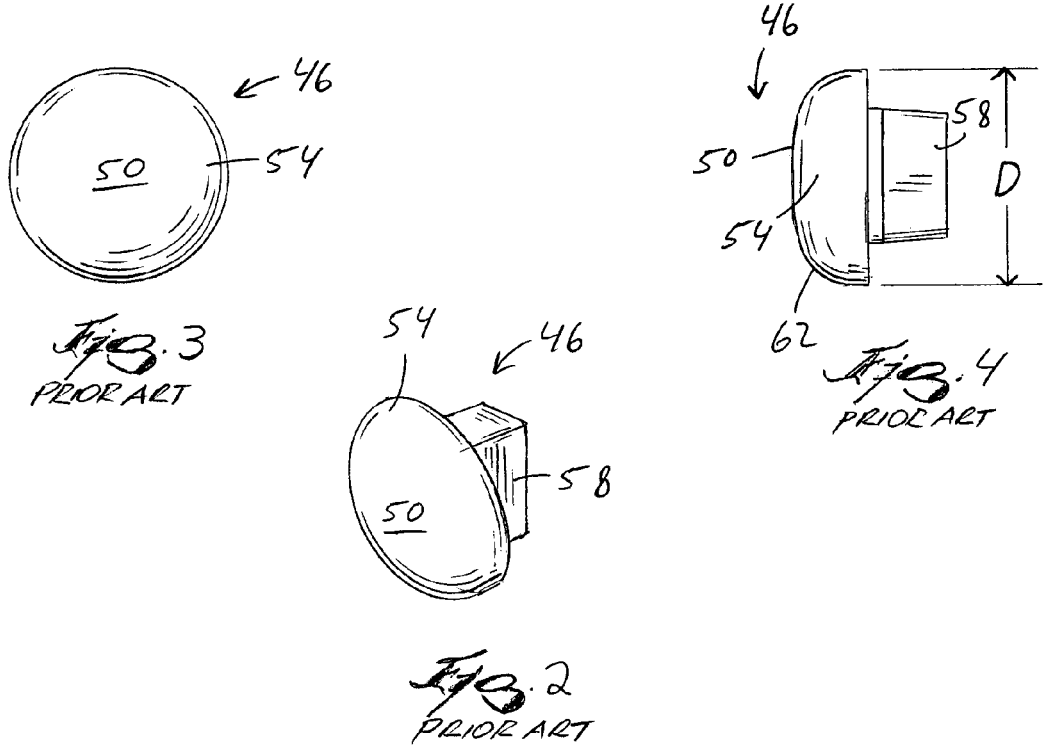
Fig.3 PRIOR ART
Fig.4 PRIOR ART
Fig.2 PRIOR ART
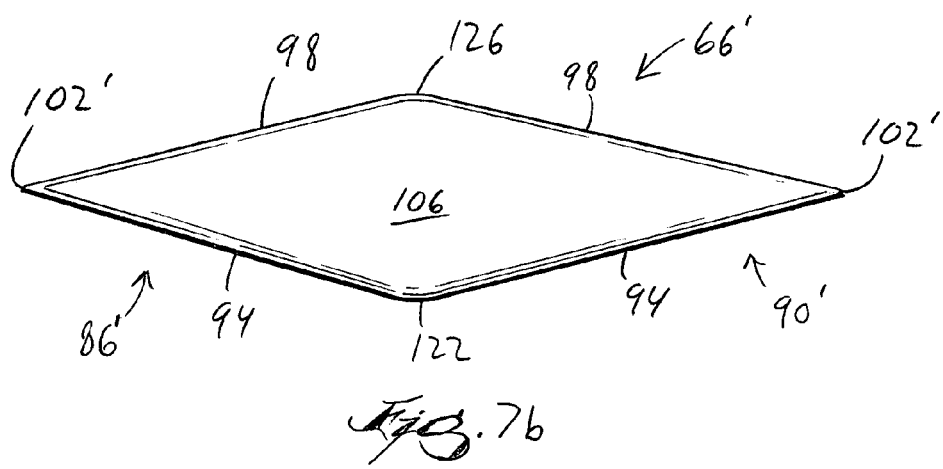
Fig.7b

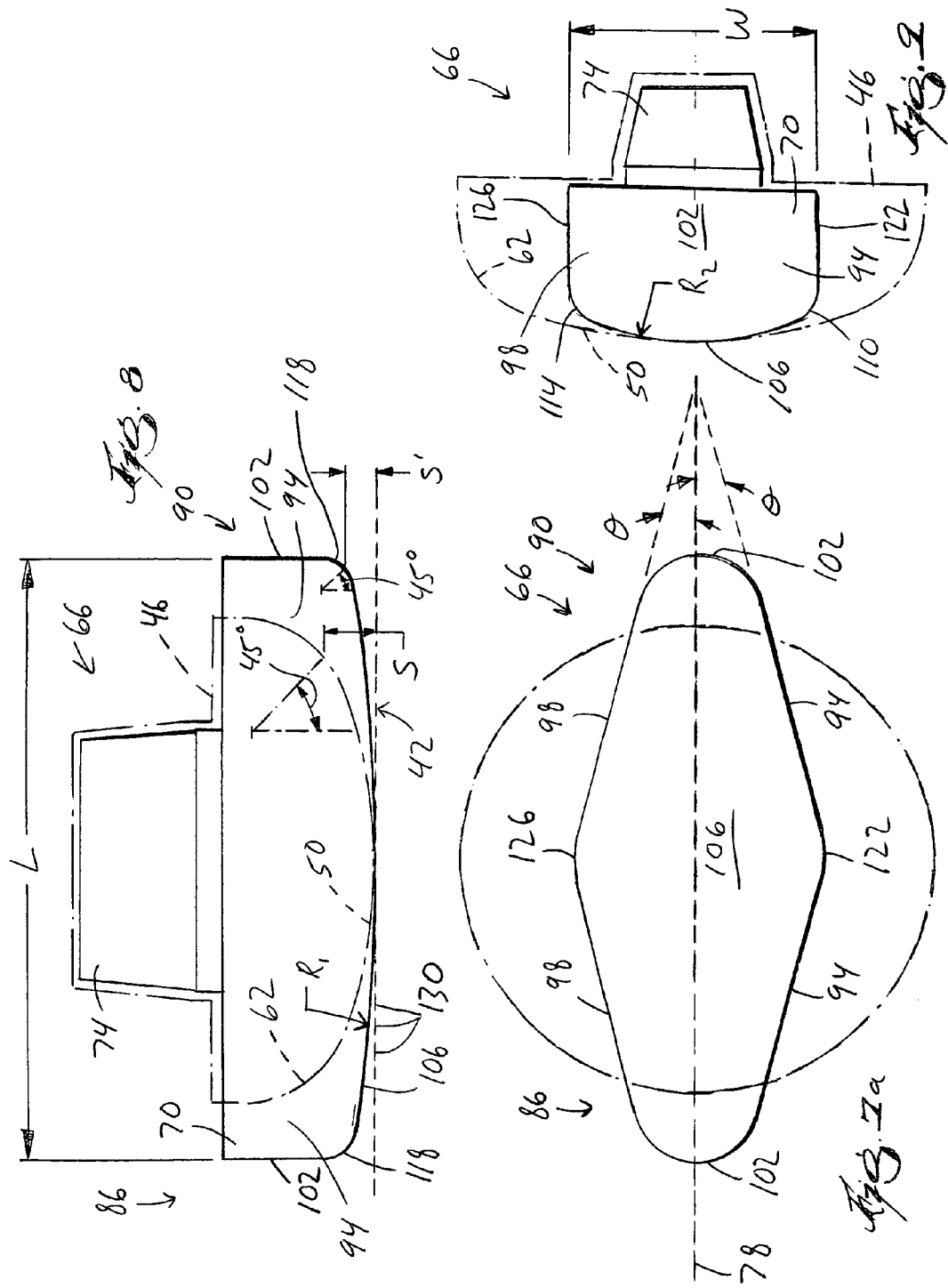

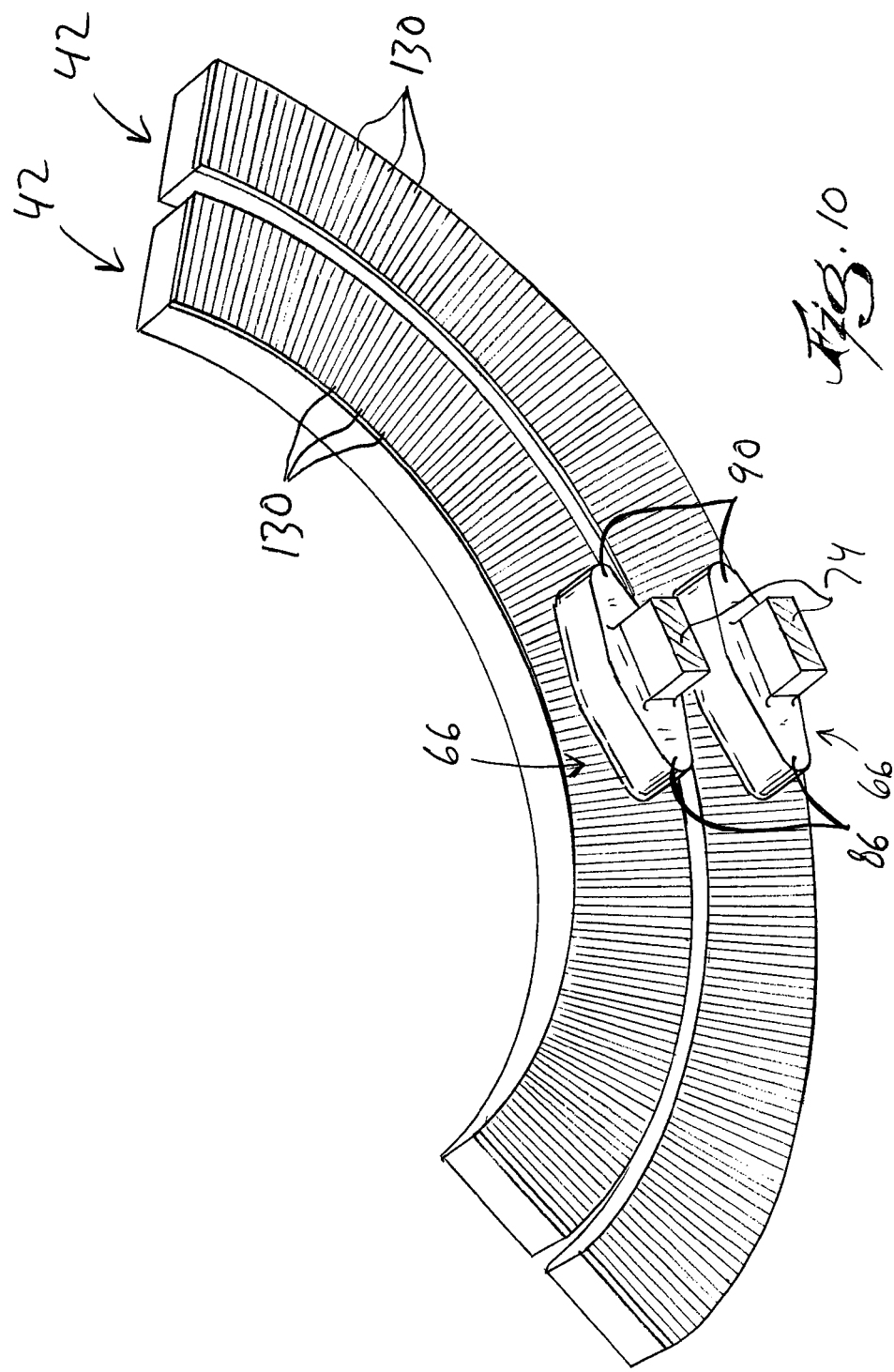

US 7,043,982 B2

FUEL LEVEL SENDING UNIT AND CONTACT BUTTON FOR SAME

FIELD OF THE INVENTION

This invention relates generally to vehicle components, and more particularly to fuel level sending units in vehicle fuel tanks.

BACKGROUND OF THE INVENTION

As shown in FIG. 1, in most vehicles, a fuel level sending unit 10 is utilized to measure the level of fuel 14 in a fuel tank 18. Typically, the fuel level sending unit 10 is mounted on a fuel pump module 20 and includes a float 22 that is buoyant in the fuel 14, and a pivot arm 26 connecting the float 22 with a wiper 30 of a variable resistor or potentiometer 34. The potentiometer 34 provides an electrical signal to operate a display (not shown) so that an operator can monitor the fuel level in the fuel tank 18 of a vehicle. The electrical signal provided by the potentiometer 34 is proportional to the position of the float 22 as the fuel level in the fuel tank 18 changes.

The potentiometer 34 typically includes a resistor plate 38 having one or more elongated electrical resistor paths 42 that are connected across a supply voltage. The wiper 30 is movable along the resistor paths 42 and is in electrical contact with the resistor paths 42. Typically, the resistor paths 42 are laid out along an arcuate pathway and the wiper 30 is mounted for rotation substantially about the center of the arcuate resistor paths 42.

One or more contact buttons 46 are usually coupled to the wiper 30 for sliding and electrical contact with the resistor paths 42. FIGS. 2–4 illustrate a prior art contact button 46. Conventional contact buttons 46 may sometimes be in the form of a conductive metal rivet or other cylindrical body having a substantially curved or semi-spherical surface 50 in contact with the resistor path 42. The conventional contact button 46 includes a head 54 and a shank 58 extending from the head 54. In some constructions of the conventional contact button 46, the head 54 includes a diameter dimension D of about 2.8 mm. The surface 50 has a substantially semi-spherical contour, and a portion of the surface 50 is in sliding contact with a respective resistor path 42. In some constructions of the conventional contact button 46, the surface 50 defines a radius of about 3.0 mm. Also, in some constructions of the conventional contact button 46, a blend radius 62 is defined between the surface 50 and the upper portion of the head 54. Such a blend radius 62 can be about 0.9 mm. In the illustrated construction of FIGS. 2–4, the conventional contact button 46 is in the form of a rivet, with the shank 58 being at least partially deformable to secure the contact button 46 to the wiper 30.

SUMMARY OF THE INVENTION

Fuel level sending units are subjected to the harsh environment of the fuel tank. During operation of the vehicle, contaminants or debris may accumulate within the fuel tank and may be spread throughout the fuel tank by movement or "sloshing" of the fuel during vehicle maneuvering. This debris may sometimes come into contact with the variable resistor or potentiometer to adversely affect operation and/or performance of the fuel level sending unit. For instance, debris in the path of the contact button/resistor interface may cause the contact button to separate from the resistor path. Consequently, the electrical signal output by the potentiometer may be interrupted, or may be erratic upon repeated interruption by the debris. Such an erratic electrical signal input to the operator display may cause undesirable fluctuation of the display or inaccurate fuel level readings.

The present invention provides a contact button configured to move along a resistor path of a potentiometer in a first direction and a second direction opposite the first direction. The contact button includes a body having a first end configured to lead the body when the contact button moves in the first direction, and a second end configured to lead the body when the contact button moves in the second direction. At least one of the first and second ends is generally wedge-shaped to facilitate moving debris out of a path of the contact button as the contact button moves along the resistor path.

In another aspect, the present invention provides a fuel level sending unit including a float, an arm coupled to the float, a wiper coupled to the arm and responsive to movement of the float, a resistor plate having a resistor path thereon, and a button coupled to the wiper for sliding movement along the resistor path in a first direction and a second direction opposite the first direction. The button includes a first end configured to lead the button when moving in the first direction, and a second end configured to lead the button when moving in the second direction. Both of the first and second ends are generally wedge-shaped to facilitate moving debris out of a path of the button as the button moves along the resistor path.

In yet another aspect, the invention provides a plurality of resistor traces coupled to the resistor plate and positioned along the resistor path in spaced increments, and a button coupled to the wiper for sliding movement along the resistor path in a first direction and a second direction opposite the first direction. The button includes an arcuate surface configured to slide along the resistor path and span the increment between two adjacent resistor traces such that a jouncing motion of the button is substantially prevented as the button moves along the resistor path.

In a further aspect, the invention provides an arcuate surface on the button having a portion in sliding contact with the resistor path, and an edge portion tangent with the arcuate surface. The edge portion and the resistor path define an edge gap therebetween of no more than about 0.10 mm.

The invention further provides a method for removing debris from a pathway of a button traveling along a resistor path of a potentiometer. The method includes providing a button having a wedge-shaped end, moving the button along the resistor path in a first direction such that the wedge-shaped end leads the button along the resistor path, and moving the debris away from a pathway of the button with the wedge-shaped end.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts:

FIG. 2 is a perspective view of a prior art contact button of the fuel level sending unit of FIG. 1.

FIG. 3 is an end view of the prior art contact button of FIG. 2.

FIG. 4 is a side view of the prior art contact button of FIG. 2.

FIG. 7a is an end view of the contact button of FIG. 6, with the prior art contact button shown in phantom for comparison.

FIG. 7b is an end view of another construction of a contact button.

FIG. 8 is a side view of the contact button of FIG. 6, with the prior art contact button shown in phantom for comparison.

FIG. 9 is a front view of the contact button of FIG. 6, with the prior-art contact button shown in phantom for comparison.

FIG. 10 is a perspective view of the contact buttons of FIG. 6 moving along a resistor path of a potentiometer.

Figure 1:
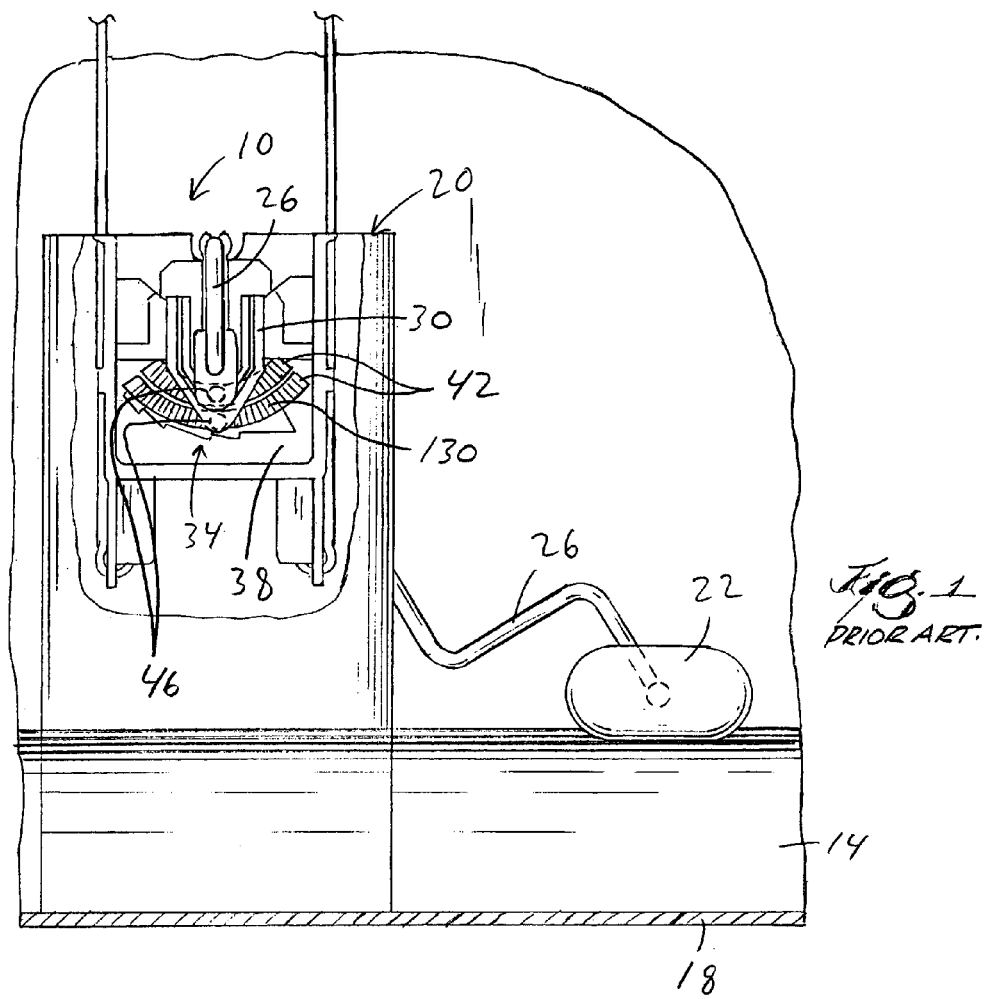
FIG. 1 is a partial cutaway view of a prior art fuel level sending unit coupled to a fuel pump module located within a fuel tank.

Before any features of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 5:
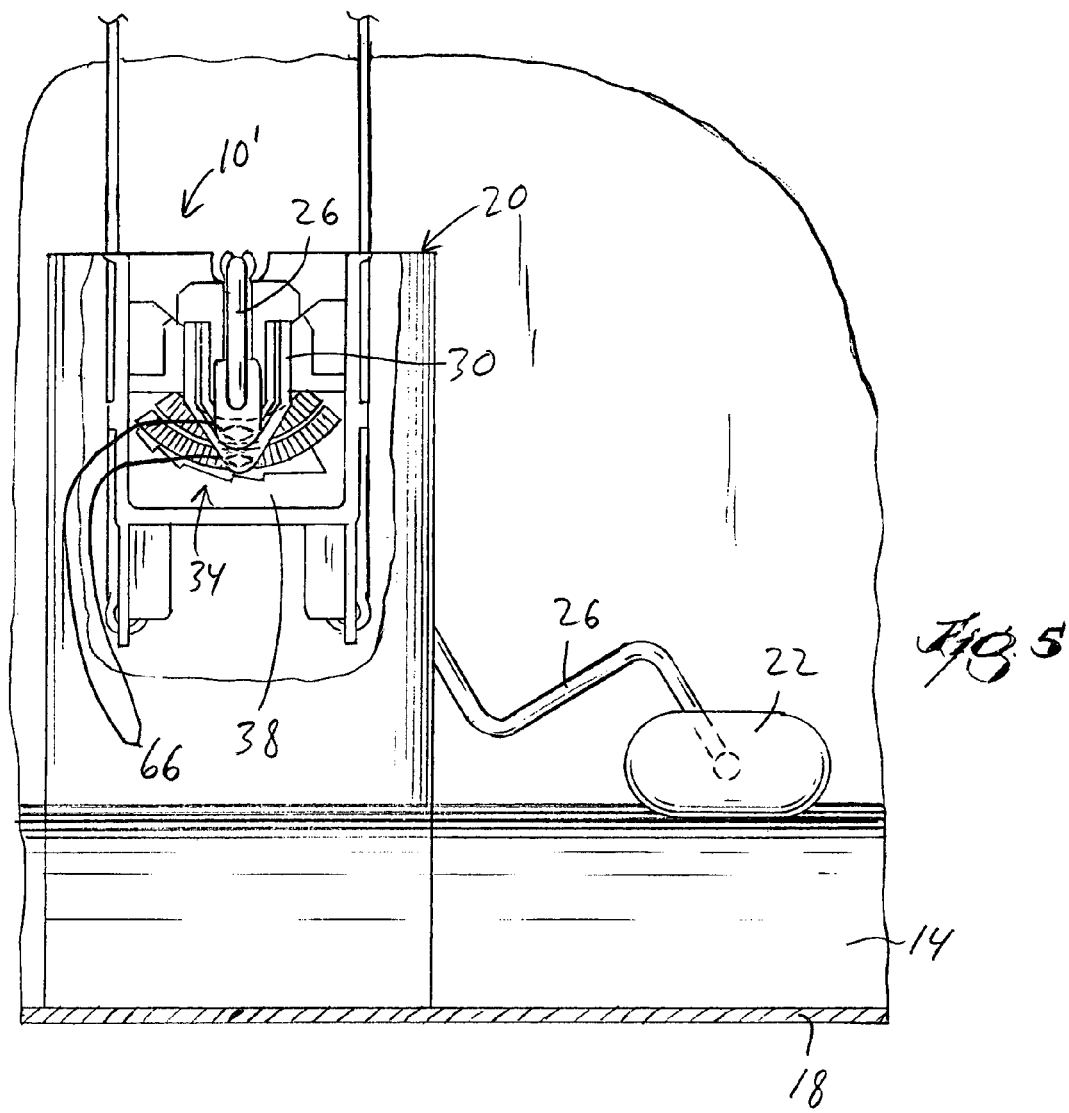
FIG. 5 is a partial cutaway view of a fuel level sending unit of the present invention coupled to a fuel pump module located within the fuel tank.

FIG. 5 illustrates a fuel level sending unit 10' including improved contact buttons 66. With the exception of the contact buttons 66, the fuel level sending unit 10' is similar to the fuel level sending unit 10 described above and like parts have been given like reference numerals.

FIGS. 6–9 illustrate the contact button 66 of the invention. The contact button 66 generally includes an elongated body, or head 70, and a shank 74 extending from the head 70. Like the prior-art conventional contact button 46, the shank 74 may be at least partially deformable so that conventional methods may be used to secure the contact button 66 to the wiper 30.

The contact button 66 may be made from a highly-conductive metal or metal alloy, such as a gold-plated platinum alloy. A coining process may be used to manufacture the contact button 66. The coining process may affect the final shape of the contact button 66, and variations of the illustrated shape are contemplated in the invention. Other suitable manufacturing processes can also be used to form the button 66.

Figure 6:
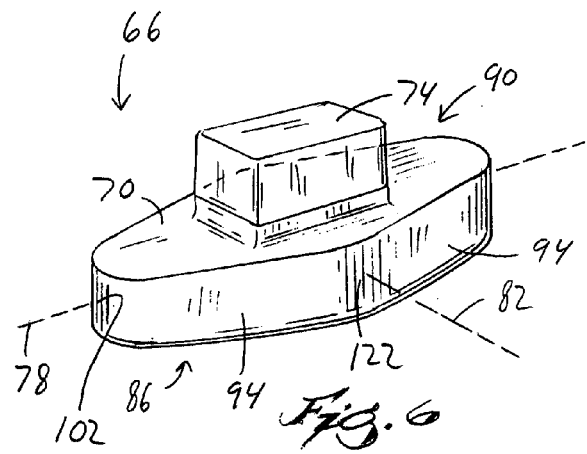
FIG. 6 is a perspective view of a contact button of the fuel level sending unit of FIG. 5.

Referring to FIG. 6, the head 70 is elongated along a longitudinal axis 78 passing through the head 70 to define a length dimension of the head 70. In the illustrated construction, the head 70 includes (see FIG. 8) a length dimension L of about 3.4 mm. Further, the head 70 defines a lateral axis 82 substantially normal to the longitudinal axis 78. As seen in FIG. 9, a width dimension W of the head 70 is defined along the lateral axis 82. In the illustrated construction, the width dimension W is about 1.4 mm.

With reference to FIGS. 7a and 9, the width dimension W of the contact button 66 is narrower than the diameter dimension D of the prior-art contact button 46 (shown in phantom). This feature makes it less likely that the contact button 66 will encounter debris accumulated in the path traveled by the contact button 66 since the path traveled by the contact button 66 is narrower than the path traveled by the prior art contact button 46.

The head 70 defines two generally wedge-shaped ends 86, 90. As used herein and in the appended claims, the term "wedge-shaped" means a substantially tapered or triangular shape such as that generally associated with a wedge used for splitting, tightening, securing, or levering. The term "wedge-shaped" may also be used to describe a wedge-like body as described above having a rounded or blunted tip. The first wedge-shaped end 86 is configured to lead the head 70 when the head 70 moves in a first direction along the resistor path 42 (see FIGS. 5 and 10), and the second wedge-shaped end 90 is configured to lead the head 70 when the head 70 moves in a second direction opposite the first direction. As will be described in greater detail below, the first and second wedge-shaped ends 86, 90 facilitate moving debris out of a path traveled by the contact button 66 as the button 66 moves along the resistor path 42. The path traveled by the contact button 66 may be described as the portion of the resistor path 42 in sliding contact with the button 66. The path traveled by the contact button 66 may also be called a "wear path," since repeated use of the potentiometer 34 may result in the contact button 66 slightly wearing down the portion of the resistor path 42 in contact with the button 66.

As best shown in FIGS. 6 and 7a, the first and second wedge-shaped ends 86, 90 each include a first substantially planar sidewall portion 94 oblique to the longitudinal axis 78, a second substantially planar sidewall portion 98 oblique to the longitudinal axis 78, and an apex portion 102 interconnecting the first and second sidewall portions 94, 98. In the illustrated construction, the apex portion 102 defines a radius of about 0.35 mm. The first and second sidewall portions 94, 98 are tangent to the apex portion 102, and each define an angle θ relative to the longitudinal axis 78 of about 16°.

FIG. 7b illustrates another construction of a contact button 66'. Features common to both contact buttons 66, 66' are labeled with like reference numerals. The contact button 66' includes substantially non-blunted or non-rounded apex portions 102', thereby defining alternately configured wedge-shaped ends 86', 90'.

During use of the fuel level sending unit 10' in the fuel tank 18, the contact button 66 is moved along the resistor path 42 due to the action of the float 22 on the surface of the fuel 14 in the fuel tank 18 (see FIG. 5). During such movement, the contact button 66 may encounter debris accumulated on the resistor path 42. The debris will contact the apex portion 102 or either of the first and second sidewall portions 94, 98 of the wedge-shaped ends 86, 90. Debris contacted by the apex portion 102 is parted toward either the first t sidewall portion 94 or the second sidewall portion 98. The apex portion 102 works in a similar manner to a snow-plow, in that it is able to contact and move debris from the path traveled by the contact button 66. Compared to the circularly-shaped head 54 of the prior-art contact button 46, the apex portion 102 more effectively separates and pushes through debris accumulated in the path traveled by the contact button 66.

After debris is initially separated by the apex portion 102, the first and second sidewall portions 94, 98 then continue to sweep the debris away from the longitudinal axis 78 and out of the path traveled by the contact button 66 as the button 66 continues to move along the arcuate resistor path 42. By moving debris out of the pathway of the contact button 66 in this manner, the debris is less likely to come between the portion of the head 70 in contact with the resistor path 42 and the resistor path 42, thereby reducing the occurrence of the contact button 66 losing contact with the resistor path 42. Therefore, the potentiometer 34 is more likely to provide the display with a more stable electrical signal that is proportional to the amount of fuel 14 in the fuel tank 18.

As shown in FIGS. 6–8, the contact button 66 is substantially symmetrical about the lateral axis 82 such that the second wedge-shaped end 90 of the contact button 66 is substantially the same as the first wedge-shaped end 86. As a result, the contact button 66 has a generally canoe-shaped appearance. A first intermediate sidewall portion 122 blends the first sidewall portions 94 of the respective first and second wedge-shaped ends 86, 90, while a second intermediate sidewall portion 126 blends the second sidewall portions 98 of the respective first and second wedge-shaped ends 86, 90. In the illustrated construction, the first and second intermediate sidewall portions 122, 126 each define a radius of about 0.70 mm.

A button surface 106 is substantially transverse to the first and second sidewall portions 94, 98 and the apex portion 102. The surface 106 faces the resistor path 42 and is configured for sliding electrical contact with resistor traces 130 (see FIG. 8) on the resistor path 42. As best shown in FIG. 9, the first sidewall portion 94 is blended with the surface 106 by a first side edge portion 110 and the second sidewall portion 98 is blended with the surface 106 by a second side edge portion 114. As shown in FIG. 8, the apex portions 102 are blended with the surface 106 by a leading edge portion 118. In the illustrated construction, the first and second side edge portions 110, 114 and the leading edge portions 118 each define a radius of about 0.20 mm. Compared to the blend radius 62 of the prior-art contact button 46, the radii of the first and second side edge portions 110, 114 and the leading edge portions 118 are substantially smaller. By decreasing these radii, the likelihood that a piece of debris will be able to enter and become wedged between the surface 106 and the resistor path 42 is greatly reduced.

In the illustrated construction (see FIG. 8), an edge gap S' exists between the leading edge portion 118 and the resistor path 42. This is in contrast to the prior art contact button 46, in which a larger edge gap S exists between the blend radius 62 and the resistor path 42. As seen in FIG. 8, the edge gap S is defined between the top surface of the resistor path 42 and the midpoint of the arc defining the blend radius 62. The midpoint is located 45° from a reference line normal to the resistor path 42 and passing through the center point of the blend radius 62. Likewise, the edge gap S' is defined between the top surface of the resistor path 42 and the midpoint of the arc defining the leading edge portion 118, with the midpoint located 45° from a reference line normal to the resistor path 42 and passing through the center point of the leading edge portion 118. By positioning the surface 106 and the leading edge portion 118 in closer proximity to the resistor path 42, debris larger than the illustrated edge gap S', or about 0.07 mm, is substantially prevented from entering and becoming wedged beneath the contact button 66.

With continued reference to FIG. 8, testing of the contact button 66 has indicated that any debris having a diameter larger than the edge gap S of the prior art contact button 46 will probably not slide under or become wedged beneath the contact button 66 as it moves along the resistor path 42. If a piece of debris was to slide under the contact button 66, the piece of debris would likely become pressed into the wear path. During testing, debris having a diameter larger than the edge gap S was not viewed in the wear path. Therefore, such debris was prevented from sliding under or becoming wedged beneath the contact button 66, and was swept away from the wear path by the contact button 66.

Testing has also indicated that debris having a diameter smaller than the edge gap S, but larger than the edge gap S', will probably slide under the prior-art contact button 46, but not the contact button 66. As a result, more of the debris in the wear path of the contact button 66 will be prevented from sliding under or becoming wedged beneath the contact button 66, and more of the debris will be swept away from the wear path than would otherwise be the case with the prior art contact button 46. Therefore, the contact button 66 will be less likely to lose contact with the resistor path 42 while moving along the path 42, and a potentiometer 34 utilizing the contact button 66 will provide a more stable electrical signal indicative of the amount of fuel 14 in the fuel tank 18.

With reference to FIG. 8, the contact button 66 is shown slidably moving along the resistor path 42. The resistor traces 130 are positioned along the resistor path 42 in spaced increments. In the illustrated construction, each resistor trace 130 is about 0.25 mm wide, and the increment between adjacent resistor traces 130 is about 0.2 mm. The increment between adjacent resistor traces 130 typically causes the prior art contact button 46 (shown in phantom) to undergo a vertical bobbing, or jouncing motion in a direction transverse to the resistor path 42 while moving along the resistor path 42. The jouncing motion is a result of the surface 50 having such a radius that the trace-contacting portion of the surface 50 only contacts one or two resistor traces 130 at any given point during travel of the contact button 46. As a result, the prior art contact button 46 tends to consecutively fall and rebound between adjacent resistor traces 130 while moving along the resistor path 42.

As shown in FIG. 8, a longitudinal radius $R_1$ (described in more detail below) of the surface 106 is much larger than the radius of the surface 50 of the prior art contact button 46. As a result, the trace-contacting portion of the surface 106 bridges or spans more than two resistor traces 130 at any given time, resulting in smoother, substantially jounce-free movement of the contact button 66 along the resistor path 42.

During movement of the button 66 along the resistor path 42, the portion of the surface 106 in contact with the resistor path 42 (i.e., the individual resistor traces 130) imparts a shear stress on the resistor path 42. For proper operation and longevity of the potentiometer 34, the portion of the surface 106 in contact with the resistor path 42 should not impart a shear stress larger than the maximum allowable shear stress that is sustainable by the resistor path 42 (otherwise known as the "shear strength" of the resistor path 42). If the portion of the surface 106 in contact with the resistor path 42 imparts a shear stress higher than the shear strength of the resistor path 42, the resistor path 42 is likely to be damaged.

The applied shear stress to the resistor path 42 is dependent upon the area of the portion of the surface 106 in contact with the resistor path 42, which, in turn, is dependent upon the shape of the surface 106. The surface 106 is defined by the first radius $R_1$ extending in the direction of the longitudinal axis 78, and a second radius $R_2$ extending in the direction of the lateral axis 82. For a given force applied to the resistor path 42 by the button 66, the area of the portion of the surface 106 in contact with the resistor path 42 should be substantially equal to or greater than a particular value to yield an acceptable shear stress on the resistor path 42. For this reason, radii $R_1$ and $R_2$ are interrelated values. For example, as the radius $R_2$ decreases, the radius $R_1$ may increase to prevent the area of the portion of the surface 106 in contact with the resistor path 42 from decreasing and to prevent the applied shear stress to the resistor path 42 from increasing. In the illustrated construction, radius $R_1$ is about 20 mm, while radius $R_2$ is about 3.0 mm.

One skilled in the art will understand that a range of $R_1$ and $R_2$ values can be selected to achieve acceptable shear stresses on the resistor path 42. For example, $R_1$ can range from at least about 15 mm to about 50 mm, and $R_2$ can range from about 2.5 mm to about 3.0 mm.

While the interrelation of radii $R_1$ and $R_2$ is important in designing the contact button 66 for acceptable shear stresses (the "shear stress criteria"), other dimensional relationships are also significant. For example, the edge gap S' can be altered to achieve a desired minimum edge gap S' value (the "edge gap criteria").

The length L of the contact button 66, the radius of the leading edge portion 118, the radius of each side edge portion 110, 114, and the longitudinal radius $R_1$ drive the edge gap criteria. In the illustrated construction, as the longitudinal radius $R_1$ increases, as the button length L decreases, and as the radius of the leading edge portion 118 decreases, the illustrated edge gap S' of 0.07 mm can be reduced to a minimum calculated edge gap S' of about 0.04 mm. Such a minimum calculated edge gap S' is established to allow for manufacturing and assembly tolerances that could result in a minimum actual edge gap S' of less than 0.04 mm. In designing for the edge gap criteria, the length L can range from at least about 3.0 mm up to about 4.0 mm. The radius of the leading edge portion 118 and each side edge portion 110, 114 can range up to about 0.20 mm. Preferably, the edge gap S' is not greater than 0.10 mm.

It is understood that designing the contact button 66 for the shear stress criteria impacts the edge gap criteria, and vice versa. Furthermore, designing the contact button 66 for the shear stress criteria and the edge gap criteria impacts the configuration of the wedge-shaped ends 86, 90. For example, changes in the length L impact the wedging or plowing characteristics of the contact button 66 (the "wedge shape criteria").

The wedge shape criteria is driven by the length L, the width W, the radius of the apex portion 102, the relative angles θ defined between the longitudinal axis 78 and the sidewall portions 94, 98, and the radius of the intermediate sidewall portions 122, 126. It has been found that a width W in the range of at least about 1.3 mm to no more than about 1.8 mm facilitates meeting the wedge shape criteria, while also allowing the contact button 66 to meet the shear stress criteria and the edge gap criteria. Likewise, a range for the radius of the apex portion 102 of at least about 0.30 mm and no more than about 0.40 mm is suitable. Additionally, as shown in FIG. 7b, a radius smaller than 0.30 mm for the apex portion 102' can be used. Sidewall angles θ can range from at least about 11° up to about 23°. Intermediate sidewall portions 122, 126 can have radii ranging from at least about 0.65 mm up to about 0.80 mm.

It can therefore be seen that the design parameters for the contact button 66 are substantially interrelated and can be optimized to achieve the desired shear stress criteria, edge gap criteria, and wedge shape criteria. Additionally, the design parameters for the contact button 66 can be optimized in such a way so that no jouncing motion occurs as the contact button 66 travels along the resistor path 42.

Various features of the invention are set forth in the following claims.

I claim:

1. A potentiometer comprising:
   a wiper;
   a resistor plate having a resistor path thereon; and
   a button coupled to the wiper for sliding movement along the resistor path in a first direction and a second direction opposite the first direction, the button including a first end configured to lead the button when moving in the first direction, and a second end configured to lead the button when moving in the second direction, at least one of the first and second ends being generally wedge-shaped to facilitate moving debris out of a path of the button as the button moves along the resistor path.

2. The potentiometer of claim 1, wherein the button defines a longitudinal axis and is elongated in a direction substantially parallel to the longitudinal axis.

3. The potentiometer of claim 2, wherein the button has a length dimension defined along the longitudinal axis, the length dimension being at least about 3.0 mm.

4. The potentiometer of claim 2, wherein the button has a width dimension defined transverse to the longitudinal axis, the width dimension being no more than about 1.8 mm.

5. The potentiometer of claim 2, wherein the first end of the button is defined by
   a first sidewall portion oblique to the longitudinal axis;
   a second sidewall portion oblique to the longitudinal axis; and
   an apex portion interconnecting the first and second sidewall portions.

6. The potentiometer of claim 5, wherein the apex portion of the button has a radius of no more than about 0.40 mm.

7. The potentiometer of claim 5, wherein each of the first and second sidewall portions of the button define an angle θ with the longitudinal axis, θ being at least about 11°, but no more than about 23°.

8. The potentiometer of claim 5, wherein the first end of the button is further defined by
   a surface substantially transverse to the first sidewall portion, the second sidewall portion, and the apex portion;
   a first side edge portion interconnecting the surface and the first sidewall portion; and
   a second side edge portion interconnecting the surface and the second sidewall portion.

9. The potentiometer of claim 8, wherein at least one of the first and second side edge portions of the button have a radius of no more than about 0.20 mm.

10. The potentiometer of claim 8, further comprising a leading edge portion interconnecting the apex portion and the surface, the leading edge portion having a radius of no more than about 0.20 mm.

11. The potentiometer of claim 8, wherein the surface of the button has a radius of at least about 15 mm in a direction extending along the longitudinal axis.

12. The potentiometer of claim 1, wherein both the first and second ends of the button are generally wedge-shaped.

13. A potentiometer comprising:
   a wiper;
   a resistor plate having a resistor path thereon;
   a plurality of resistor traces coupled to the resistor plate and positioned along the resistor path in spaced increments; and
   a button coupled to the wiper for sliding movement along the resistor path in a first direction and a second direction opposite the first direction, the button including an arcuate surface configured to slide along the resistor path and span the increment between two adjacent resistor traces such that a jouncing motion of the button is substantially prevented as the button moves along the resistor path;
wherein the button defines a longitudinal axis and is elongated in a direction substantially parallel to the longitudinal axis; and
wherein the button includes a ratio of a radius of the arcuate surface in a longitudinal direction to a length dimension in the longitudinal direction of at least 2 to 1.

14. The potentiometer of claim 13, wherein the button has a length dimension defined along the longitudinal axis, the length dimension being at least about 3.0 mm.

15. The potentiometer of claim 13, wherein the surface of the button is arcuate in a longitudinal direction and has a radius of at least about 15 mm.

16. The potentiometer of claim 13, wherein the increment between two adjacent resistor traces is about 0.2 mm.

17. The potentiometer of claim 1, further comprising:
a float coupled to the wiper, the wiper being responsive to movement of the float.

18. The potentiometer of claim 17, wherein the potentiometer is configured to be positioned in a fuel tank and is operable to determine the amount of fuel in the fuel tank.

19. The potentiometer of claim 13, further comprising:
a float coupled to the wiper, the wiper being responsive to movement of the float.

20. The potentiometer of claim 19, wherein the potentiometer is configured to be positioned in a fuel tank and is operable to determine the amount of fuel in the fuel tank.

21. The potentiometer of claim 13, wherein the ratio of the radius of the arcuate surface in the longitudinal direction to the length dimension in the longitudinal direction is about 5 to 1.

* * * * *